May 13, 1958

J. H. KNOWLES 2,834,175

COTTON HARVESTER

Filed May 14, 1953

James H. Knowles
INVENTOR.

BY
Attorneys

May 13, 1958 J. H. KNOWLES 2,834,175
COTTON HARVESTER
Filed May 14, 1953 4 Sheets-Sheet 2
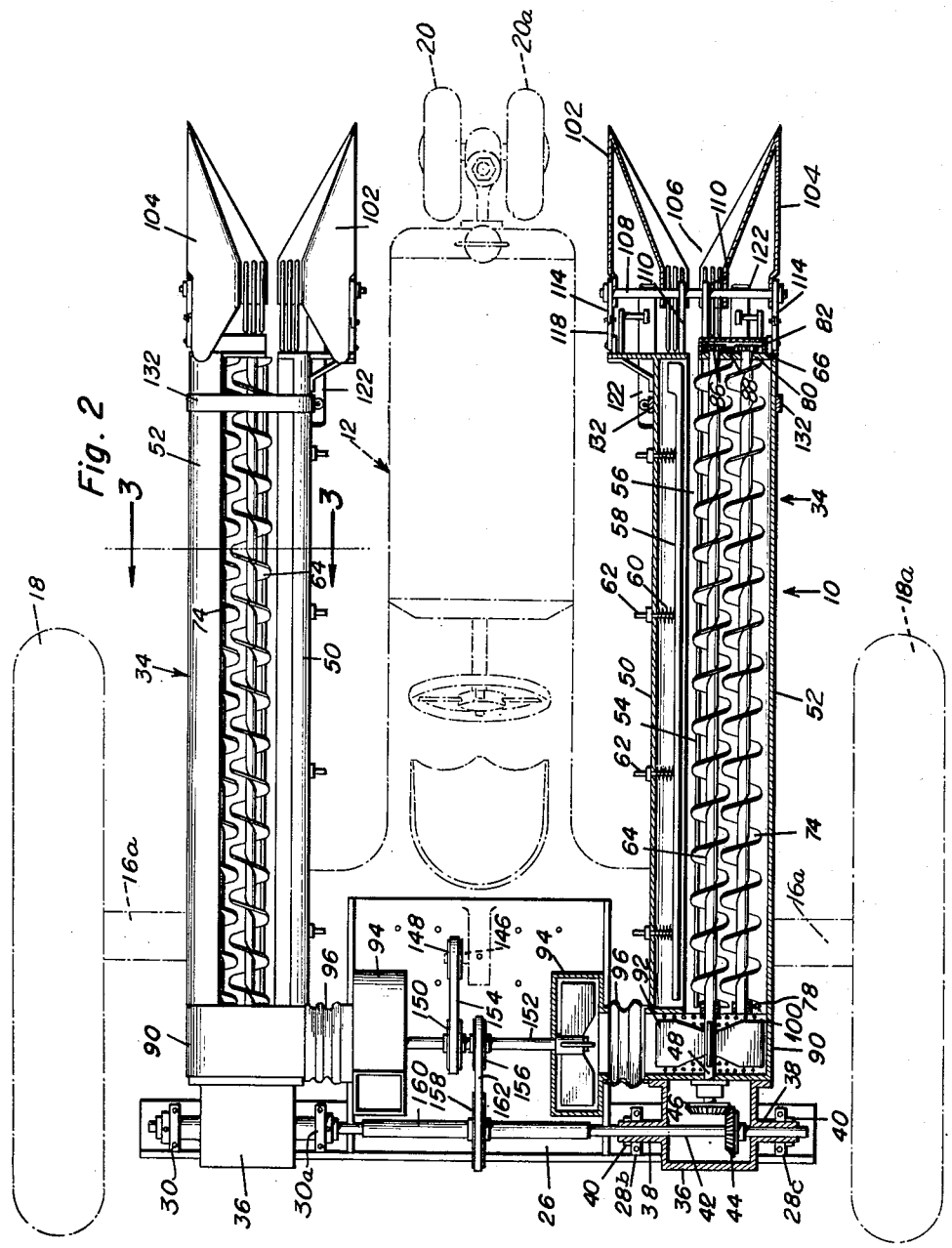
James H. Knowles
INVENTOR.

May 13, 1958  J. H. KNOWLES  2,834,175
COTTON HARVESTER
Filed May 14, 1953  4 Sheets-Sheet 3
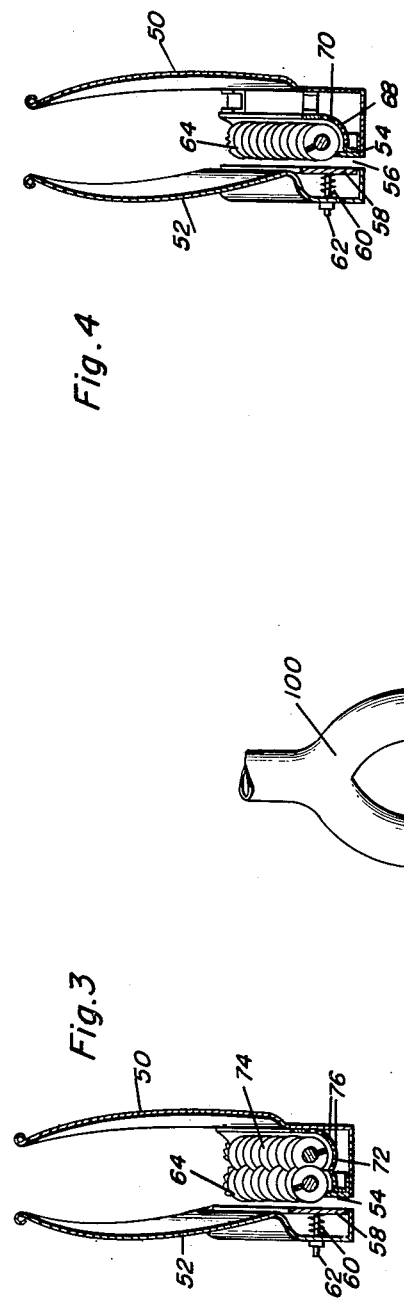
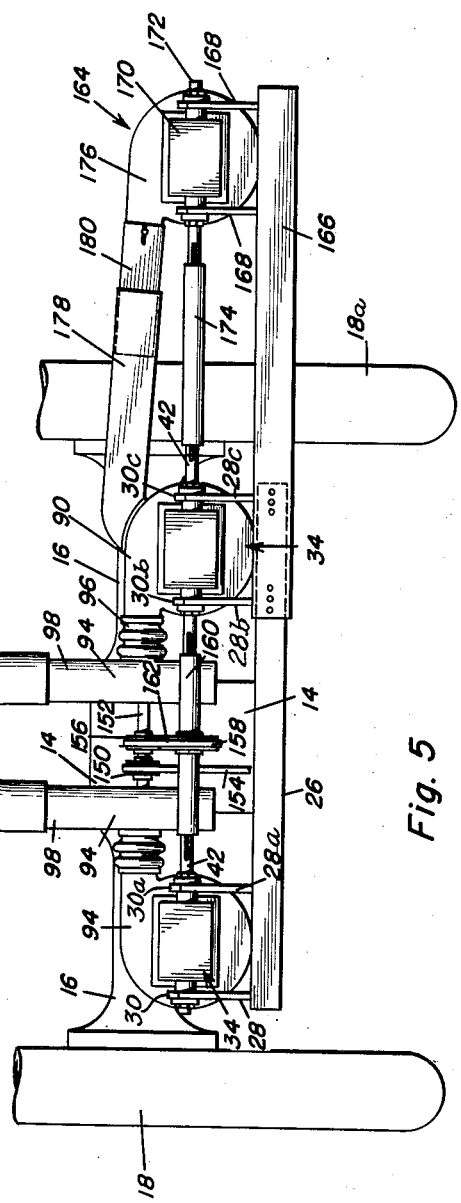
James H. Knowles
INVENTOR.

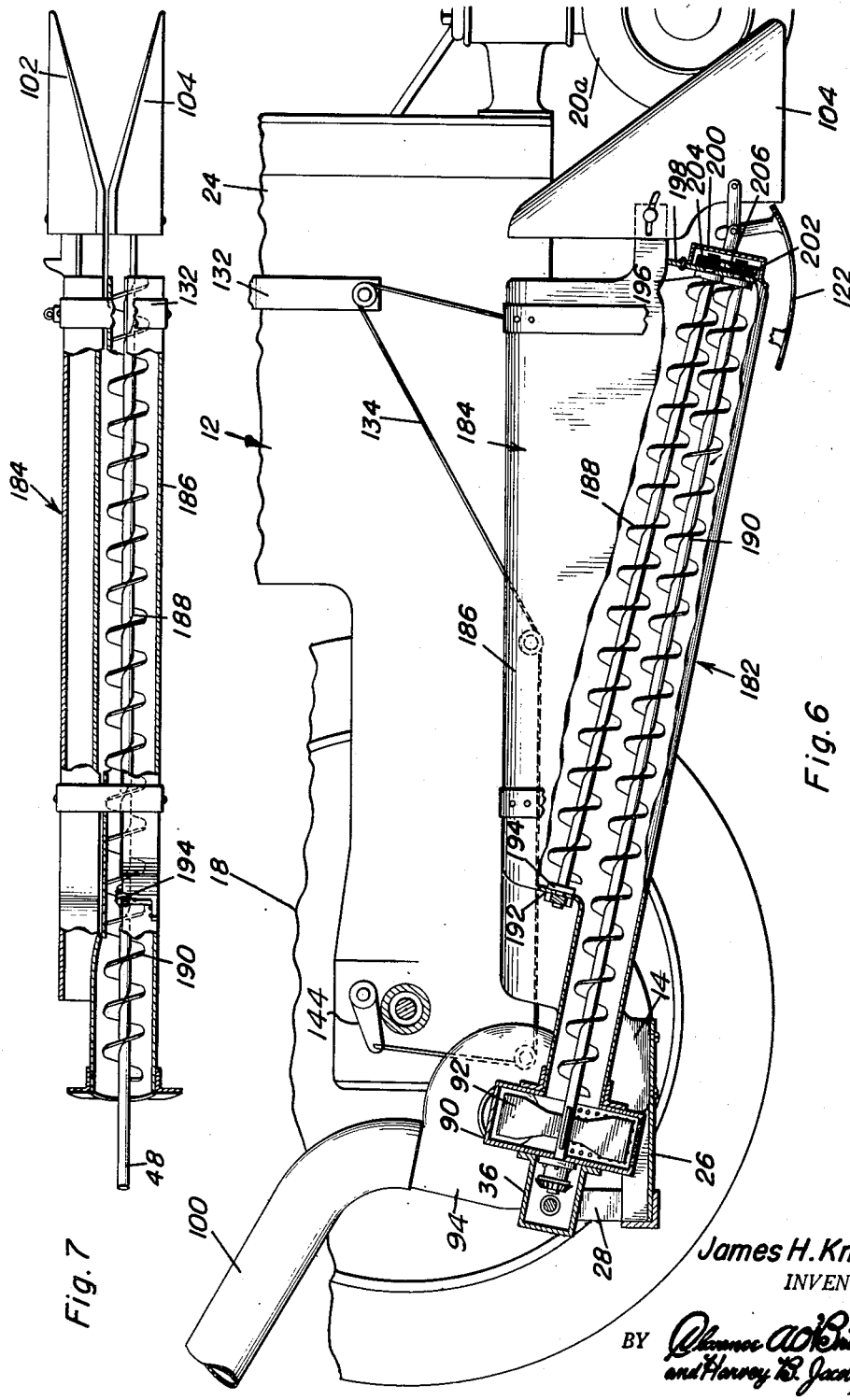

United States Patent Office 2,834,175
Patented May 13, 1958

2,834,175

COTTON HARVESTER

James H. Knowles, Tulia, Tex.

Application May 14, 1953, Serial No. 355,062

7 Claims. (Cl. 56—33)

This invention relates in general to improvements in cotton harvesters, and more specifically to an improved cotton harvesting attachment for tractors.

The primary object of this invention is to provide an improved cotton harvester attachment for a tractor which includes a pair of harvesting units disposed at opposite sides of a tractor, the individual harvesting units being mounted on the tractor for transverse adjustment whereby the same may be aligned with various spacings of rows of cotton plants.

Another object of this invention is to provide an improved cotton harvester attachment for tractors which includes a platform adapted to be rigidly secured to a tractor, the platform having mounted thereon a transversely extending drive shaft, forwardly extending harvester units pivotally carried by said platform for pivoting about the axis of said drive shaft, said drive shaft being operatively connected to cutter means of each of the harvester units.

Another object of this invention is to provide an improved harvesting attachment for tractors which includes a platform adapted to be carried by a tractor, the platform having mounted thereon a pair of harvesting units, the platform being provided with an extension on which is mounted an auxiliary harvesting unit, the extension and the auxiliary harvesting unit being removable.

Another object of this invention is to provide an improved harvesting unit for tractors, the harvesting unit being of a relatively simple and compact construction and being so arranged whereby the same may be conveniently mounted on and removed from a tractor.

Another object of this invention is to provide an improved harvesting unit which is so constructed and arranged whereby trash deposited therein in a harvesting operation will be substantially eliminated by the conveying system thereon.

A further object of this invention is to provide an improved harvesting unit which includes a pair of spaced cases forming a guideway for cotton plants, one of the cases having mounted therein a combined cutting and conveying auger, a guide associated with said auger, the guide being replaceable by a modified form of guide which facilitates the mounting of an auxiliary conveying auger adapted to be removably carried by the particular case.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a top plan view of the tractor and cotton harvester of Figure 1, the tractor being shown in dotted lines and a harvesting unit of the cotton harvester having portions thereof broken away and shown in section in order to clearly illustrate the details thereof including specific crop guiding means;

Figure 3 is a transverse sectional view taken substantially upon the plane indicated by the section line 3—3 of Figure 2 and shows the general construction of a harvesting unit when the same is provided with a pair of augers;

Figure 4 is a transverse sectional view similar to Figure 3 and shows the same harvesting unit when one of the augers has been removed;

Figure 5 is a fragmentary rear elevational view on a reduced scale of the tractor and cotton harvester and showing the cotton harvester being provided with an auxiliary harvesting unit, only portions of the tractor being shown;

Figure 1:
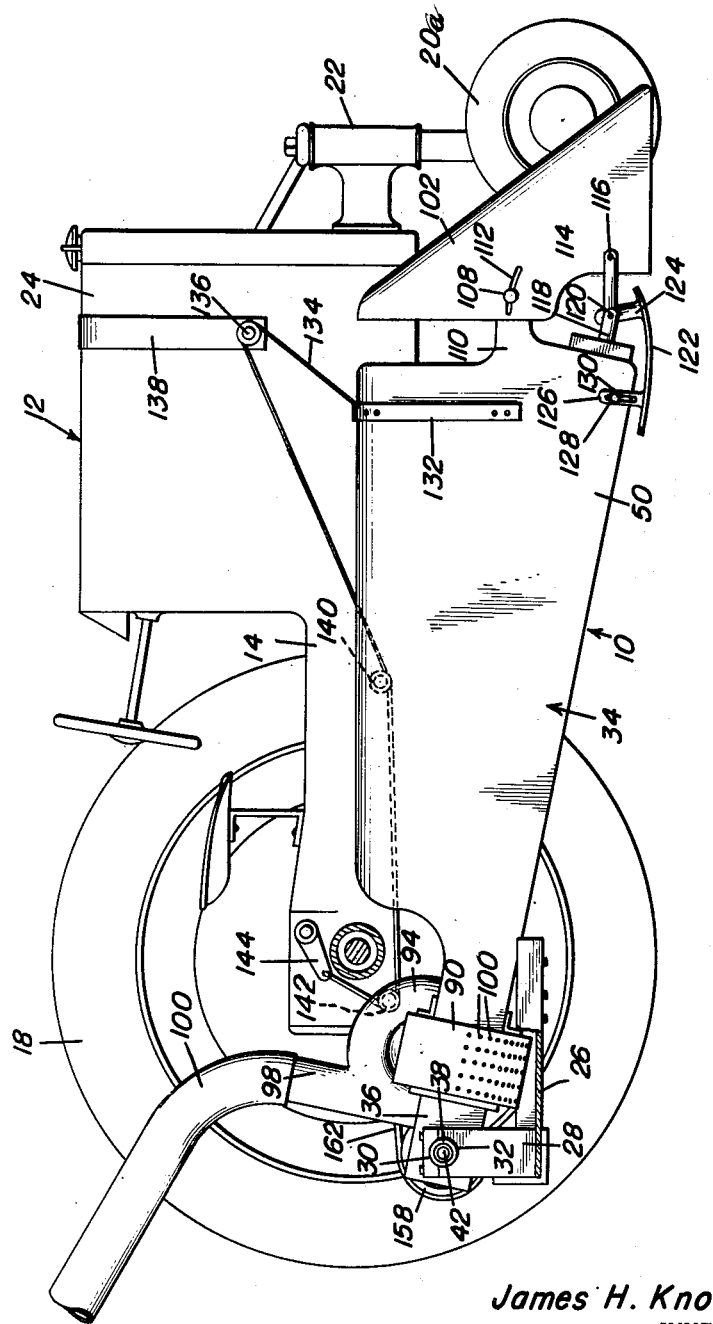
Figure 1 is a side elevational view of a tractor having mounted thereon the cotton harvester which is the subject of this invention with parts of the tractor broken away and shown in section.

Figure 6 is an enlarged side elevational view of a modified form of cotton harvester, portions of a harvesting unit thereof being broken away and shown in section in order to clearly illustrate the construction thereof; and Figure 7 is a fragmentary top plan view of one of the harvesting units of the cotton harvester of Figure 6, portions thereof being broken away and shown in section in order to clearly illustrate the arrangement of elements thereof.

Referring now to the drawings, it will be seen that there is illustrated in Figures 1 through 3, inclusive, a preferred form of cotton harvester which is referred to in general by the reference numeral 10. The cotton harvester 10 is in the form of an attachment and is illustrated mounted on a tractor for which it is intended, the tractor being referred to in general by the reference numeral 12.

The tractor 12 is of a conventional type and includes a supporting frame 14 which has extending outwardly from the rear thereof, rear axle housings 16, 16a. Carried by axles (not shown) disposed in the rear axle housing 16, 16a are rear wheels 18, 18a. The tractor 12 also includes a pair of front wheels 20, 20a carried by a front steering assembly 22. Disposed at the front portion of the tractor 12 is a hood portion 24 within which is mounted a motor (not shown) for the tractor.

The cotton harvester 10 includes a platform 26 which is mounted at the rear of the tractor 12 and which is secured to the underside of the frame 14 thereof between the rear wheels 18. Carried by the platform 26 at each side thereof is a pair of transversely spaced upstanding supports 28, 28a, 28b and 28c which have secured to their upper ends thereof removably caps 30, 30a, 30b and 30c. Each of the supports and its associated cap are provided with complementary openings which form a circular bore 32.

The cotton harvester 10 includes a pair of harvesting units which are disposed on opposite sides of the tractor 12 between the frame 14 and the rear wheels 18 thereof. The harvesting units which are referred to by the reference numeral 34, are right and left hand units although otherwise identical in construction.

Each of the harvesting units 34 includes a gear case 36 disposed at the rear thereof. The gear case 36 has extending outwardly from the sides thereof tubular trunnions 38 which are rotatably mounted within the bores 32 of the supports 28 which are disposed on opposite sides thereof. The gear cases 36 are shiftable transversely of the platform 26 which is T-shaped in outline, as is best illustrated in Figure 2, and the gear cases 36 are retained in adjusted positions by collars 40 mounted on the trunnions 38 thereof.

Carried by each of the gear cases 36 is a stub drive shaft 42 which is rotatably mounted in its associated trunnions. The stub drive shaft 42 has mounted thereon a gear 44 which is meshed with the gear 46 mounted on a shaft 48 which extends forwardly through the forward end of the gear box 36.

Each of the harvesting units 34 also includes a supporting frame in the form of a pair of longitudinally extending, spaced cases 50 and 52 whose cross sections are best illustrated in Figures 3 and 4. It will be noted that the case 50 is the innermost of the two cases and has secured to the lower inner edge thereof a vertically extending, fixed cutter bar 54. The cutter bar 54 forms one side of a guideway 56 between the two cases 50 and 52, the guideway 56 being adapted to receive portions of cotton plants from which cotton bolls are to be removed. The opposite side of the guideway 56 is formed by a longitudinally extending plate 58 pivotally carried by the case 52 at its ends. In order that the plate 58 may be retained adjacent the cutter 54, the same is urged outwardly by springs 60 mounted on transversely extending fasteners 62 connecting the plate 58 to the case 52 and limiting outward movement thereof.

Mounted within the case 50 in partial overlying relation to the guideway 56 is a combined cutting and conveying auger 64. The auger 64 has its forward end supported by a forward wall 66 of the case 50 and is an extension of the shaft 48.

In Figure 4 there is shown a slightly modified form of harvesting unit from that shown in Figure 3. Normally the lower portion of the case 50 is provided with a removable guide 68 disposed therein beneath the auger 64, the guide 68 being complementary to the outline of the auger 64. In order that trash or other foreign matter entering into the case 50 may be disposed of, the guide 68 is provided with a plurality of apertures 70 to permit the exit of such trash or foreign matter.

It will be understood that the auger 64 is of such a size that the cotton bolls (not shown) cut in a normal harvesting operation may be delivered by the same. However, in the case of an extra heavy crop the auger 64 will be insufficient to convey the cotton bolls rearwardly. Therefore, the guide 68 has been made removable and replaceable by a guide 72. The guide 72 is of a shape whereby an auxiliary conveying auger 74 may be conveniently mounted in the lower portion of the case 50 adjacent the auger 64 for cooperation therewith. Like the guide 68, the guide 72 is removable and has a plurality of apertures 76 therethrough to facilitate the removal of trash or other foreign matter.

Referring now to Figure 2 in particular, it will be seen that carried by the case 50 adjacent the rear thereof is a bearing 78 which is spaced vertically above the bottom of the case 50. The bearing 78 is in alignment with an aperture 80 in the forward wall 66 of the case 50 which functions as a bearing for the forward end of the auxiliary auger 74. The shaft portion of the auxiliary auger 74 is rotatably mounted in the bearing 78 and the opening 80 and has mounted on the forward end thereof a gear 82. The gear 82 is mounted in a gear housing 84 adjacent a gear 86 carried at the forward end of the shaft 48. Disposed within the gear housing 84 and meshing with both the gear 82 and the gear 86 is an idler gear 88, the idler gear permitting the shafts of the augers 64 and 74 to rotate in the same direction whereby the augers may function together to move cotton bolls rearwardly through the case.

Disposed at the rear of the cases 50 and 52 is a housing 90, the housing forming portions of the two cases. The housing 90 is disposed at the forward end of the gear box 36 and is rigidly secured thereto. Mounted within the housing 90 on the shaft 48 for rotation therewith is a paddle wheel 92.

Disposed adjacent the housing 90 and rigidly mounted on the platform 26 is a blower 94. The blower 94 is connected with the housing 90 by a flexible duct 96 and is adapted to receive cotton bolls from the associated harvesting unit 34 due to the action of the paddle wheel 92. The blower 90 is provided with upwardly and rearwardly extending duct 98 which is connected to the lower end of the bifurcated duct 100 which joins together the ducts 98 of adjacent blowers 94. In order that any trash entering the housing 90 may be removed, the bottom portion thereof is provided with a plurality of apertures 100 through which trash may be forced out due to the action of the paddle wheel 92.

In order that cotton plants may be led into the guideway 56 of each harvesting unit, the cases 50 and 52 are provided at their forward ends with row guides 102 and 104, respectively. The row guides 102 and 104 are substantially identical although they are left and right hand and are disposed in spaced relation so as to form a guideway 106 therebetween in alignment with the guideway 56. The row guides 102 and 104 are connected together by a transversely extending pivot shaft 108 which is pivotally carried by a plurality of forwardly extending brackets 110 carried by the forward ends of the cases 50 and 52. As is best illustrated in Figure 1, the pivot 108 is disposed in arcuate slots 112 in the row guides 102 and 104 to facilitate pivoting of the row guides.

The lower portions of the individual row guides 102 and 104 are connected to their respective cases by links 114 whose forward ends are pivotally connected to the row guides as at 116 and whose rear ends are pivotally connected to a supporting bracket 118 as at 120.

In order that the forward end of the cases 50 and 52 may follow the contour of the ground over which the tractor 12 is moving, each of the cases 50 and 52 is provided with an arcuate runner 122. The runner 122 has a forward upstanding support 124 which is pivotally connected to the support 118 as at 120. The rear end of each runner 120 is provided with an upstanding bracket 126 which is connected to a pin 128 carried by its associated case. It will be noted that the pin 128 is disposed in an elongated slot 130 in its associated support 126 to facilitate vertical adjustment of the runner 122.

In order that the individual harvesting units 34 may be moved out of engagement with the ground, the forward portions of the case 50 and 52 are connected together by an inverted U-shaped yoke 132. The yoke 132 has connected to the upper end thereof a forward end of a flexible connector 134 which is entrained over a pulley 136 carried by a yoke 138 mounted on the hood 24 of the tractor 12.

The flexible connector 134 passes over a pair of rearwardly spaced pulleys 140 and 142 carried by the frame 14 and the rear end of the flexible connector 134 is connected to a power lift arm 144 of the tractor 12.

Referring now to Figures 2 and 5 in particular, it will be seen that the tractor 12 is provided with a power take-off shaft 146 on which is mounted a drive pulley 148. The guide pulley 148 is aligned with a pulley 150 mounted on a common drive shaft 152 for the blowers 94, and is operatively connected thereto by a drive belt 154. The drive shaft 152 is provided with a pulley 156 which is aligned with a pulley 158. The pulley 158 is carried by a drive shaft connector 160 which is connected to the inner ends of the stub drive shaft 42. The pulleys 156 and 158 are drivingly connected by a drive belt 162 entrained thereover.

It will be seen that the cotton harvester 10 is so constructed and arranged whereby when the tractor 12 moves forwardly down between a pair of adjacent rows of cotton plants the individual cotton plants will be led into the harvesting units 34 thereof. Inasmuch as the gear boxes 36 are adjustable transversely of the platform 26, it will be seen that the harvesting units 34 may be aligned with the rows of cotton plants to permit the maximum harvesting efficiency.

In order that rows of cotton in excess of two may be harvested at the same time, the cotton harvester 10 may also include an auxiliary harvesting unit which is referred to in general by the reference numeral 164. The auxiliary harvesting unit 164 is identical to its adjacent harvesting unit 34 and is carried by an extension 166 which is adjustably and removably secured to an outwardly disposed portion of the T-shaped platform 26. The extension 166 is provided with a pair of spaced upstanding supports 168 identical with the supports 128. The supports pivotally receive trunnions of a gear box 170 of the harvesting unit 164. Carried by the gear box 170 is a transversely extending stub drive shaft 172 which is connected to the outer end of an associated stub drive shaft 42 by a drive shaft connector 174.

In order that the auxiliary harvesting unit 164 may be adjustably aligned with a row of cotton plants, the drive shaft connector 174 is slidably connected to the stub drive shafts 42 and 172 and the gear box 170 is adjustable with respect to the extension 166 as well as the extension 166 being adjustable with respect to the platform 26. The paddle wheel housing 90 of an adjacent harvesting unit 34 is connected to a paddle wheel housing 176 of the auxiliary harvesting unit 164 by a pair of telescoping ducts 178 and 180. It will be understood that cotton bolls delivered to the paddle wheel housing 176 will be delivered through the ducts 178 and 180 into the paddle housing 90 from where they will be delivered into an associated blower 98.

Referring now to Figures 6 and 7 in particular, it will be seen that the tractor 12 is illustrated as having mounted thereon a modified form of cotton harvester which is referred to in general by the reference numeral 182. A cotton harvester 182 is identical to the cotton harvester 10 in every detail with the exception of forward portions of harvesting units thereof, the harvesting units being referred to in general by the reference numeral 184. The forward portions of the individual harvesting units 184 differ from the forward portions of the harvesting units 34 inasmuch as the outer case 186 thereof is provided permanently with a conveying auger 188 in addition to a combined cutter and conveying auger 190, the auger 190 being identical with the auger 64 of the harvesting units 34.

The case 186 includes an upper rear wall portion 192 which has mounted therein a suitable bearing 194 receiving the rear end of the auger 188. The forward end of the auger 188 is journaled in a bearing 196 carried by a forward wall 198 of the case 186. Disposed at the forward side of the forward wall 198 is a housing 200. The forward end of the augers 190 and 188 are provided with aligned sprockets 202 and 204, respectively.

The sprockets 202 and 204 have entrained thereover a drive chain 206 which facilitates the driving of the auger 188 by the auger 190.

It will be understood that the auger 188 overlies the auger 190 and cooperates therewith to move cotton bolls cut by the auger 190 rearwardly into the paddle wheel housing 90 at the rear of the case 186. The remainder of the harvesting operation of the cotton harvester 182 is identical with that described above relative to the cotton harvester 10.

It will be understood that the individual harvesting units 184 of the cotton harvester 182 are adjustably mounted on the tractor 12 in identically the same manner as the harvesting units 34. Also, the harvesting units 184 are provided at forward ends with row guides which are identical with the row guides of the harvesting units 34.

While it has not been illustrated, if desired, the supporting platform 26 for the harvesting units 184 may be provided with a suitable extension on which an auxiliary harvesting unit identical with one of the harvesting units 184 may be mounted whereby more than two rows of cotton plants may be harvested at one time with the cotton harvester 182.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A cotton harvester comprising a supporting frame, an auger type cutter carried by said frame, a paddle wheel assembly mounted on said supporting frame and operatively connected to said cutter for delivering cotton bolls from said cutter to a blower, a blower connected to and communicated with said paddle wheel, delivery duct means carried by said blower.

2. A cotton harvester comprising a supporting frame, an auger type cutter carried by said frame, a paddle wheel assembly mounted on said supporting frame and operatively connected to said cutter for delivering cotton bolls from said cutter to a blower, a blower connected to and communicated with said paddle wheel, delivery duct means carried by said blower, said cutter including a rotating shaft, said paddle wheel assembly including a paddle wheel carried by said shaft.

3. A cotton harvester comprising a supporting frame, an auger type cutter carried by said frame, a paddle wheel assembly mounted on said supporting frame and operatively connected to said cutter for delivering cotton bolls from said cutter to a blower, a blower connected to and communicated with said paddle wheel, delivery duct means carried by said blower, said cutter including a rotating shaft, said paddle wheel assembly including a paddle wheel carried by said shaft, said supporting frame, said cutter and said paddle wheel assembly being mounted as a unit for adjustment relative to said blower, whereby said cutter may be properly adjusted for varied row spacing.

4. In a cotton harvester of the type including a conveyor for delivering cotton bolls from a cutter mechanism, boll transfer means comprising a blower, a delivery duct connected to said blower, a paddle wheel assembly for simultaneously impelling cotton bolls into said blower and removing trash therefrom, means on said paddle wheel assembly for connection to the conveyor, duct means interconnecting said paddle wheel assembly and said blower.

5. In a cotton harvester of the type including a conveyor for delivering cotton bolls from a cutter mechanism, boll transfer means comprising a blower, a delivery duct connected to said blower, a paddle wheel assembly for simultaneously impelling cotton bolls into said blower and removing trash therefrom, means on said paddle wheel assembly for connection to the conveyor, duct means interconnecting said paddle wheel assembly and said blower, said paddle wheel assembly including a housing, said housing having at least one trash discharge passageway.

6. A cotton harvester comprising a supporting frame, an auger type cutter carried by said frame, a paddle wheel assembly, said paddle wheel assembly including a housing secured to said supporting frame, a blower communicated with said housing, a paddle wheel in said housing for delivering cotton bolls from said cutter to said blower, said paddle wheel being operatively connected to said cutter for rotation.

7. A cotton harvester comprising a supporting frame, an auger type cutter carried by said frame, a paddle wheel assembly, said paddle wheel assembly including a housing secured to said supporting frame, a blower communicated with said housing, a paddle wheel in said housing for delivering cotton bolls from said cutter to said blower, said paddle wheel being operatively connected to said cutter for rotation, said housing including a lower part having trash escape passageways whereby trash is separated from said bolls simultaneous with transfer thereof by said paddle wheel.

References Cited in the file of this patent

UNITED STATES PATENTS

| | | |
|---|---|---|
| 634,873 | Brown | Oct. 17, 1899 |
| 908,637 | Appleby | Jan. 5, 1909 |
| 1,153,968 | Speck | Sept. 21, 1915 |
| 2,401,152 | Hagen | May 28, 1946 |
| 2,406,058 | Boone | Aug. 20, 1946 |
| 2,440,770 | Hagen | May 4, 1948 |
| 2,451,130 | Townsend | Oct. 12, 1948 |
| 2,475,531 | Townsend | July 5, 1949 |
| 2,482,216 | Rust | Sept. 20, 1949 |
| 2,491,777 | Smith | Dec. 20, 1949 |
| 2,493,422 | Sartin | Jan. 3, 1950 |
| 2,514,519 | Ryan | July 11, 1950 |
| 2,532,065 | Hyman | Nov. 28, 1950 |
| 2,538,748 | Fergason | Jan. 23, 1951 |
| 2,560,974 | May | July 17, 1951 |
| 2,571,865 | Greedy et al. | Oct. 16, 1951 |
| 2,660,849 | Knowles | Dec. 1, 1953 |
| 2,662,360 | Roscoe | Dec. 15, 1953 |
| 2,701,437 | Rickey et al. | Feb. 8, 1955 |